US011945118B2

(12) United States Patent
Masaoka et al.

(10) Patent No.: US 11,945,118 B2
(45) Date of Patent: Apr. 2, 2024

(54) METHOD OF PLANNING WORKS FOR ROBOTS AND WORK PLANNING DEVICE

(71) Applicant: KAWASAKI JUKOGYO KABUSHIKI KAISHA, Kobe (JP)

(72) Inventors: Koichi Masaoka, Kobe (JP); Shota Asazu, Kobe (JP); Hiroyuki Moriishi, Kobe (JP); Tomoya Sakuma, Kobe (JP); Yuji Hashiba, Kobe (JP); Jun Fujimori, Kobe (JP); Hitoshi Nariai, Kobe (JP); Kazumi Fukuhara, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 406 days.

(21) Appl. No.: 17/414,872

(22) PCT Filed: Dec. 27, 2019

(86) PCT No.: PCT/JP2019/051576
§ 371 (c)(1),
(2) Date: Jun. 16, 2021

(87) PCT Pub. No.: WO2020/138485
PCT Pub. Date: Jul. 2, 2020

(65) Prior Publication Data
US 2022/0055214 A1 Feb. 24, 2022

(30) Foreign Application Priority Data
Dec. 28, 2018 (JP) .................................. 2018-247912

(51) Int. Cl.
*B25J 9/16* (2006.01)
*G05B 19/418* (2006.01)
*G06Q 50/04* (2012.01)

(52) U.S. Cl.
CPC ........ *B25J 9/1666* (2013.01); *G05B 19/4187* (2013.01); *G06Q 50/04* (2013.01); *G05B 2219/45104* (2013.01)

(58) Field of Classification Search
CPC ...... B25J 9/1682; B25J 9/0084; B25J 9/1666; B25J 9/1661; B25J 9/1676; B25J 9/1679;
(Continued)

(56) References Cited

U.S. PATENT DOCUMENTS 5,798,627 A * 8/1998 Gilliland ................ B25J 9/1671
318/568.14
6,470,301 B1 * 10/2002 Barral .................... B25J 9/1666
703/2
(Continued)

FOREIGN PATENT DOCUMENTS

JP   H10-039909 A   2/1998
JP   H11-347984 A   12/1999
(Continued)

*Primary Examiner* — Darrin D Dunn
(74) *Attorney, Agent, or Firm* — Oliff PLC (57) ABSTRACT

A method of planning works for robots includes creating a work plan for a plurality of robots, each having a work tool, sharing at at least one station a work to a plurality of work parts of the workpiece. The method includes the steps of calculating a distribution of the work parts to the robots, calculating, as a robot operation, a work order of the work parts and a moving path of the work tool for each of the robots based on the calculated work distribution, and calculating a disposed location of each of the robots with respect to the workpiece and a station where the robot is disposed so that an inter-robot interference does not occur during execution of the calculated robot operation.

18 Claims, 6 Drawing Sheets

(58) Field of Classification Search
CPC ..... B25J 11/005; B25J 9/16; G05B 19/41865;
G05B 19/41815; G05B 2219/39146;
G05B 19/402; G05B 19/41805; G05B
19/41885; G05B 2219/32085; G05B
2219/39135; G05B 2219/40202; G05B
2219/39082; G05B 2219/39083; G05B
2219/39109; G05B 19/41825; G05B
19/4188; G05B 2219/39117; G05B
2219/39156; G05B 2219/40317; G05B
2219/45055; G05B 19/418; G05B
19/4061; G05B 19/4155; G05B 19/4187;
G05B 2219/31206; G05B 2219/31281;
G05B 2219/32181; G05B 2219/32283;
G05B 2219/32294; G05B 2219/33038;
G05B 2219/36442; G05B 2219/39001;
G05B 2219/39102; G05B 2219/39139;
G05B 2219/40113; G05B 2219/40201;
G05B 2219/40294; G05B 2219/45064;
G05B 19/0426; G05B 19/19
See application file for complete search history.

(56) References Cited

U.S. PATENT DOCUMENTS

| | | | | |
|---|---|---|---|---|
| 6,526,373 | B1* | 2/2003 | Barral | B25J 9/1666 703/2 |
| 7,729,804 | B2* | 6/2010 | Matsumoto | G05B 19/41815 700/19 |
| 8,028,293 | B2* | 9/2011 | Azar | G06F 9/5083 718/105 |
| 8,108,071 | B2* | 1/2012 | Lin | B25J 9/1674 700/250 |
| 8,315,738 | B2* | 11/2012 | Chang | B25J 9/1666 700/255 |
| 8,527,091 | B2* | 9/2013 | Bosscher | B25J 9/1676 700/250 |
| 8,571,706 | B2* | 10/2013 | Zhang | G05B 19/41885 700/253 |
| 9,513,627 | B1* | 12/2016 | Elazary | G05B 19/41895 |
| 10,005,185 | B2* | 6/2018 | Pfaff | B25J 9/1676 |
| 10,018,995 | B2* | 7/2018 | Zhang | G05B 19/4188 |
| 10,192,195 | B1* | 1/2019 | Brazeau | B25J 9/1661 |
| 10,363,659 | B2* | 7/2019 | Wise | H04L 67/1021 |
| 10,500,718 | B2* | 12/2019 | Kuffner, Jr. | B25J 9/1679 |
| 11,623,346 | B2* | 4/2023 | Colasanto | B25J 9/1682 700/245 |
| 11,635,749 | B2* | 4/2023 | Sobalvarro | G05B 19/41885 700/100 |
| 2003/0225479 | A1* | 12/2003 | Waled | B25J 9/1676 700/245 |
| 2006/0167587 | A1* | 7/2006 | Read | G05B 19/401 700/245 |
| 2008/0091301 | A1* | 4/2008 | Brantmark | G05B 19/41825 700/245 |
| 2010/0092032 | A1* | 4/2010 | Boca | B25J 9/1679 348/222.1 |
| 2010/0114338 | A1* | 5/2010 | Bandyopadhyay | B23K 37/0258 700/36 |
| 2014/0067108 | A1* | 3/2014 | Pedigo | G05B 19/41865 700/108 |
| 2017/0082985 | A1* | 3/2017 | Kozloski | G05B 19/4065 |
| 2018/0046963 | A1* | 2/2018 | Kobayashi | G06Q 10/06 |
| 2018/0326580 | A1* | 11/2018 | Wessén | G05B 19/41885 |
| 2019/0358816 | A1* | 11/2019 | Saito | B25J 9/1602 |
| 2021/0220994 | A1* | 7/2021 | Colasanto | B25J 9/1669 |
| 2022/0147059 | A1* | 5/2022 | Borne-Pons | G06Q 10/0631 |
| 2022/0339785 | A1* | 10/2022 | Larose | B25J 9/1653 |
| 2023/0171154 | A1* | 6/2023 | Kattepur | G06Q 10/0631 709/220 |

FOREIGN PATENT DOCUMENTS

| | | |
|---|---|---|
| JP | 2000-141183 A | 5/2000 |
| JP | 2000-141184 A | 5/2000 |
| JP | 2003-145276 A | 5/2003 |
| JP | 2018-026071 A | 2/2018 |

* cited by examiner

METHOD OF PLANNING WORKS FOR ROBOTS AND WORK PLANNING DEVICE

TECHNICAL FIELD

The present disclosure relates to a method and a device for creating a work plan (planning works) for a plurality of robots.

BACKGROUND ART

A method for creating a work plan for a plurality of robots is known. In this method, the plurality of robots are assigned to a plurality of stations included in a production line, and each robot performs a part of the work corresponding to one of a plurality of work parts of a workpiece. For example, Patent Document 1 discloses a method of planning works in order to perform determinations within a short period of time. The determinations are a determination of a work part to be assigned to each of a plurality of robots, and a determination of operation for each robot to perform the work to the work part.

REFERENCE DOCUMENT OF CONVENTIONAL ART

Patent Document

[Patent Document 1] JP 10-039909A

DESCRIPTION OF THE DISCLOSURE

Problem to be Solved by the Disclosure

However, in the method of planning the works disclosed in Patent Document 1, the work plan is created under a precondition where the disposed locations of the robots with respect to the workpiece and the robots allocated at the respective stations are determined in advance. Therefore, although the work plan can be created in a short period of time, the work plan is not necessarily optimal for the production line.

Therefore, one purpose of the present disclosure is to create a work plan for a plurality of robots in a short period of time, where the work plan includes, in addition to a work distribution to the plurality of robots and operation of each robot, a selection of a disposed location of each robot with respect to a workpiece and a station where each robot is allocated, and satisfies demands, such as a space-saving (fewer stations) and a shorter cycle time.

SUMMARY OF THE DISCLOSURE

In order to solve the above technical problem, according to one aspect of the present disclosure, a method of planning works for robots is provided, which includes creating a work plan for a plurality of robots, each having a work tool, sharing at at least one station a work to a plurality of work parts of a workpiece. The method includes the steps of calculating a distribution of the work parts to the robots based on the positions of the work parts and the work contents, and work capabilities of the robots, calculating, as a robot operation, a work order of the work parts and a moving path of the work tool for each of the robots based on the calculated work distribution, and calculating a disposed location of each of the robots with respect to the workpiece and a station where the robot is disposed so that an inter-robot interference does not occur during execution of the calculated robot operation.

According to another aspect of the present disclosure, a work planning device for robots is provided, which creates a work plan for a plurality of robots, each having a work tool, sharing at at least one station a work to a plurality of work parts of a workpiece. The device includes a work distribution calculating module configured to calculate a distribution of the work parts to the robots based on the positions of the work parts and work contents, and work capabilities of the robots, a robot operation calculating module configured to calculate, as a robot operation, a work order of the work parts and a moving path of the work tool for each of the robots based on the work distribution calculated by the work distribution calculating module, and a robot layout calculating module configured to calculate a disposed location of each of the robots with respect to the workpiece and a station where the robot is disposed so that an inter-robot interference does not occur during execution of the robot operation calculated by the robot operation calculating module.

Effect of the Disclosure

According to the present disclosure, the work plan for the plurality of robots can be created in a short period of time, where the work plan includes, in addition to the work distribution to the plurality of robots and operation of each robot, the selection of the disposed location of each robot with respect to the workpiece and the station where each robot is allocated, and satisfies the demands, such as the space-saving (fewer stations) and the shorter cycle time.

MODE FOR CARRYING OUT THE DISCLOSURE

One aspect of the present disclosure provides a method of planning works for robots, which includes creating a work plan for a plurality of robots, each having a work tool, sharing at at least one station a work to a plurality of work parts of a workpiece. The method includes the steps of calculating a distribution of the work parts to the robots based on the positions of the work parts and the work contents, and work capabilities of the robots, calculating, as a robot operation, a work order of the work parts and a moving path of the work tool for each of the robots based on the calculated work distribution, and calculating a disposed location of each of the robots with respect to the workpiece and a station where the robot is disposed so that an inter-robot interference does not occur during execution of the calculated robot operation.

According to this aspect, the work plan for the plurality of robots can be created in a short period of time, where the work plan includes, in addition to the work distribution to the plurality of robots and the operation of each robot, the selection of the disposed location of each robot with respect to the workpiece and the station where each robot is allocated, and satisfies the demands, such as the space-saving (fewer stations) and the shorter cycle time.

For example, when the plurality of robots of which the disposed locations with respect to the workpiece at least partially overlap with each other exist, the calculating the disposed location may include disposing the plurality of robots to different stations.

For example, the method of planning works for robots may include calculating a cycle time of the workpiece when executing the work plan, and calculating an evaluated value of the work plan based on the cycle time.

For example, the evaluating the work plan may include calculating the evaluated value of the work plan based on the cycle time and the number of stations.

For example, the method of planning works for robots may include re-distributing at least one work part of at least one robot to another robot capable of working the at least one work part, when the calculated evaluated value is below a given threshold. In this case, the calculating the robot operation includes calculating the operation of each of the robots based on the changed work distribution.

For example, the robot from which the work part is re-distributed to the another robot may be a robot with the longest work period among the plurality of robots. The work period is a period required for finishing the work to all the distributed work parts.

For example, the method of planning works for robots may include, when no feasible robot layout exists by an occurrence of the inter-robot interference, correcting the operation of one of the robots interfering with each other to an interference avoidable operation to avoid the interference by suspending the one robot while the other robot operates, changing the work order of the work parts, or changing the moving path of the work tool.

For example, the robot of which the work order of the work parts or the moving path of the work tool is changed may be a robot with a shorter work period among the robots interfering with each other.

Another aspect of the present disclosure provides a work planning device for robots, which creates a work plan for a plurality of robots, each having a work tool, sharing at at least one station a work to a plurality of work parts of a workpiece. The device includes a work distribution calculating module which calculates a distribution of the work parts to the robots based on the positions of the work parts and work contents, and work capabilities of the robots, a robot operation calculating module which calculates, as a robot operation, a work order of the work parts and a moving path of the work tool for each of the robots based on the work distribution calculated by the work distribution calculating module, and a robot layout calculating module which calculates a disposed location of each of the robots with respect to the workpiece and a station where the robot is disposed so that an inter-robot interference does not occur during execution of the robot operation calculated by the robot operation calculating module.

According to this aspect, the work plan for the plurality of robots can be created in a short period of time, where the work plan includes, in addition to the work distribution to the plurality of robots and the operation of each robot, the selection of the disposed location of each robot with respect to the workpiece and the station where each robot is allocated, and satisfies the demands, such as the space-saving (fewer stations) and the shorter cycle time.

For example, when the plurality of robots of which the disposed locations with respect to the workpiece at least partially overlap with each other exist, the robot layout calculating module may dispose the plurality of robots to different stations.

For example, the work planning device for robots may include a work plan evaluating module which calculates a cycle time of the workpiece when executing the work plan, and calculates an evaluated value of the work plan based on the cycle time.

For example, the work plan evaluating module may calculate the evaluated value of the work plan based on the cycle time and the number of stations.

For example, the work planning device for robots may include a work distribution changing module which re-distributes at least one work part of at least one robot to another robot capable of working the at least one work part, when the evaluated value calculated by the work plan evaluating module is below a given threshold. In this case, the robot operation calculating module calculates the operation of each of the robots based on the changed work distribution.

For example, the robot from which the work part is re-distributed to the another robot by the work distribution changing module may be a robot with the longest work period among the plurality of robots. The work period is a period required for finishing the work to all the distributed work parts.

For example, the work planning device for robots may include a robot operation correcting module which corrects, when no feasible robot layout exists by an occurrence of the inter-robot interference as the calculation result of the robot layout calculating module, the operation of one of the robots interfering with each other to an interference avoidable operation to avoid the interference by suspending the one robot while the other robot operates, changing the work order of the work parts, or changing the moving path of the work tool.

For example, the robot of which the work order of the work parts or the moving path of the work tool is changed by the robot operation correcting module may be a robot with a shorter work period among the robots interfering with each other.

For example, the robot may be a welding robot, and the work tool may be a welding gun.

Hereinafter, one embodiment of the present disclosure is described with reference to the drawings.

Figure 1:
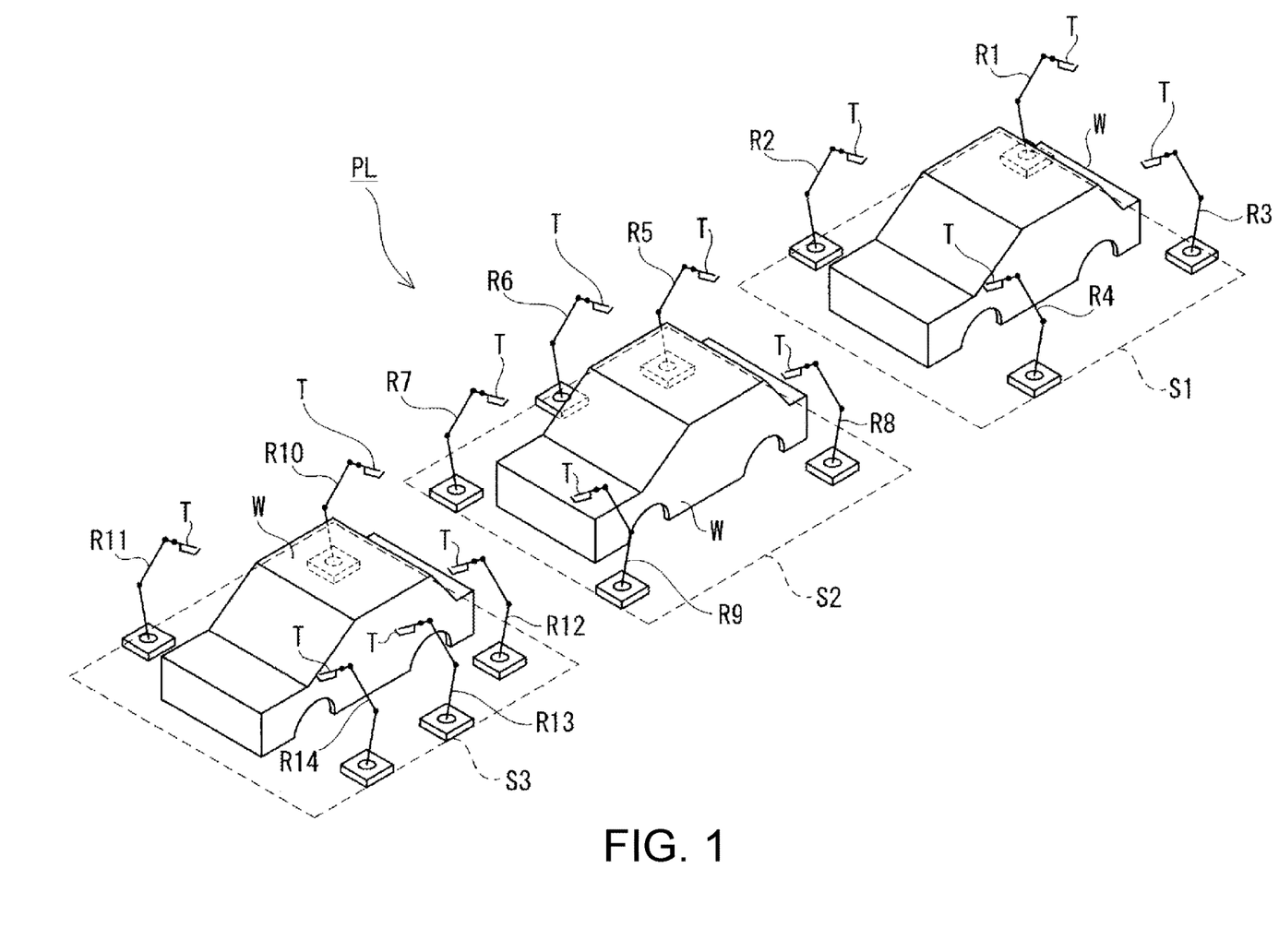
FIG. 1 is a view illustrating an example production line where a work plan created by a method of planning works for robots according to one embodiment of the present disclosure is adopted.

FIG. 1 illustrates an example production line where a work plan created by a method of planning works for robots according to one embodiment of the present disclosure is adopted.

A production line PL illustrated in FIG. 1 as one example includes a plurality of robots R1-R14, each of which performs a welding work or operation to a workpiece W which is a body of an automobile. Moreover, the production line PL is comprised of three stations S1-S3. Each of the stations S1-S3 is a location where a work is performed to the workpiece W, and when the work at the station S1 is finished, the workpiece W is conveyed to the station S2 where a work is performed. When the work at the station S2 is finished, the workpiece W is then conveyed to the station S3 where a work is performed. When the work at the station S3 is finished, all the works in the production line PL is finished, and the workpiece W is then conveyed to somewhere else, such as another production line.

In this embodiment, each of the plurality of robots R1-R14 is an articulated welding robot, and a work tool T which is a clamp-type welding gun is mounted on a tip end thereof. Note that the robots R1-R14 may have the same work capability (for example, a workable range, and a weight of the welding gun which can be mounted), or may have different work capabilities.

Figure 2:
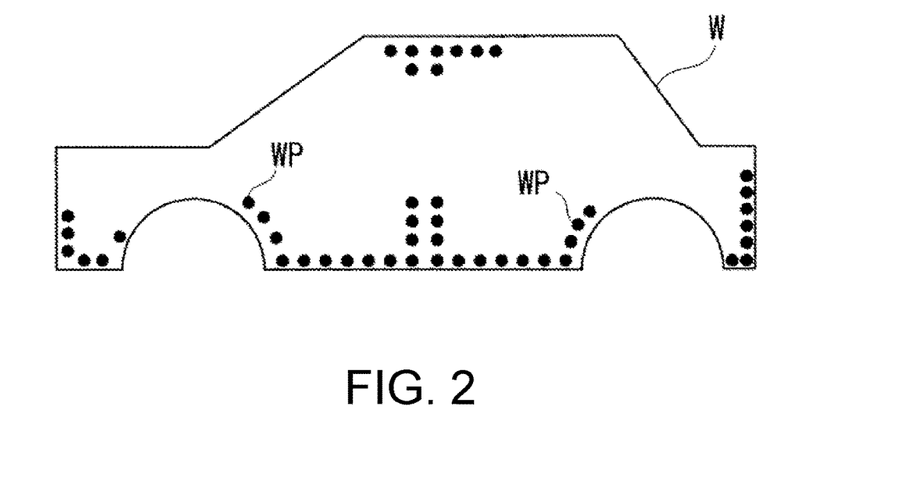
FIG. 2 is a view illustrating a plurality of work parts of a workpiece.

As illustrated in FIG. 2, each of the plurality of robots R1-R14 shares or dividedly performs the assigned work (welding operation) for each of the plurality of work parts WP (welding locations) of the workpiece W. For this purpose, as a work plan for the robots, it is necessary to determine a distribution or share ("work distribution") of the work part WP to each of the robots R1-R14, an operation ("robot operation") of each of the robots R1-R14 for performing the work to the work part WP, and a "robot layout" including a disposed location of each of the robots R1-R14 with respect to the workpiece W and the robots disposed at the stations S1-S3, respectively. That is, the work plan includes the work distribution, the robot operation, and the robot layout.

In this embodiment, the work distribution, the robot operation, and the robot layout (i.e., the work plan) are created by a work planning device.

Figure 3:
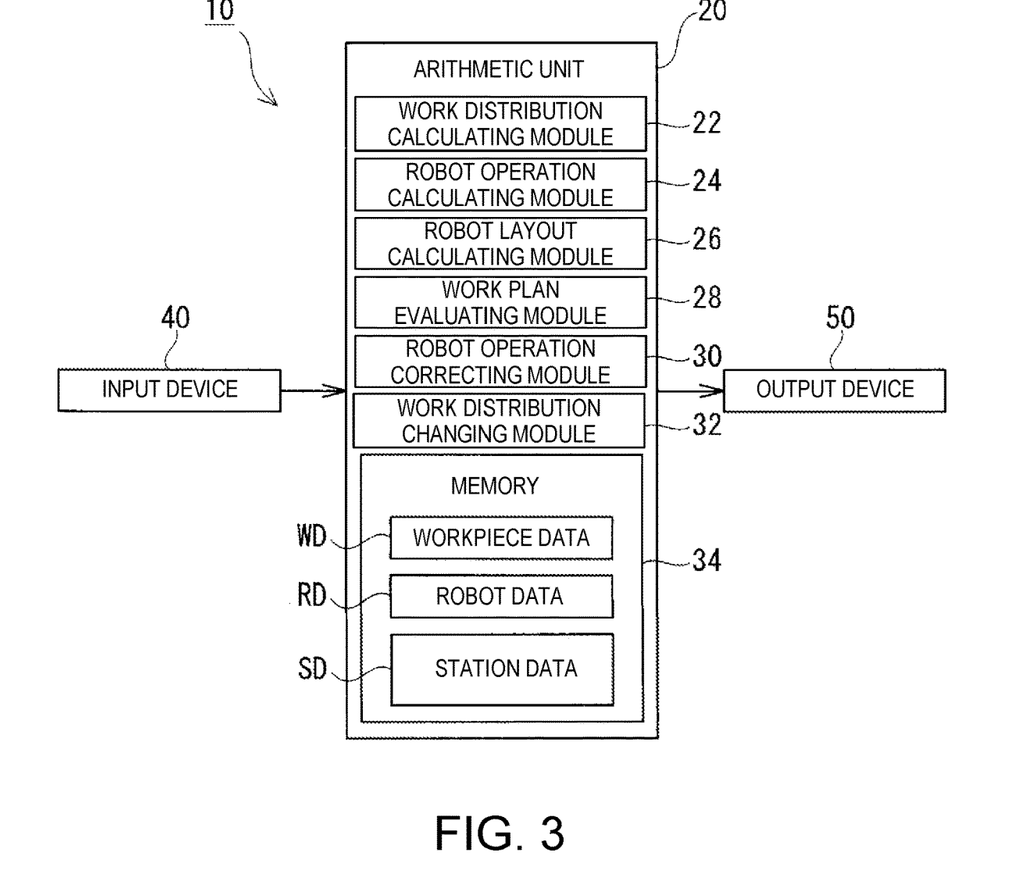
FIG. 3 is a block diagram illustrating a configuration of a work planning device.

FIG. 3 is a block diagram illustrating a configuration of the work planning device.

A work planning device 10 illustrated in FIG. 3 has an arithmetic unit 20, an input device 40, and an output device 50.

The arithmetic unit 20 of the work planning device 10 has a work distribution calculating module 22, a robot operation calculating module 24, a robot layout calculating module 26, a work plan evaluating module 28, a robot operation correcting module 30, a work distribution changing module 32, and a memory 34. This work planning device 10 is, for example, a computer provided with a processor such as a CPU, and a storage device such as a memory which stores a program (work plan creating program). By the processor driving according to the program, the processor functions as the work distribution calculating module 22, the robot operation calculating module 24, the robot layout calculating module 26, the work plan evaluating module 28, the robot operation correcting module 30, and the work distribution changing module 32.

The input device 40 is an input device, such as a mouse and a keyboard, and sends an instruction of a user to the arithmetic unit 20. The output device 50 is an output device, such as a display and a printer, and outputs the work plan created by the arithmetic unit 20 to the user.

Below, the method of creating the work plan (planning the works) for the robots executed by the work planning device 10 is described with reference to FIG. 4.

Figure 4:
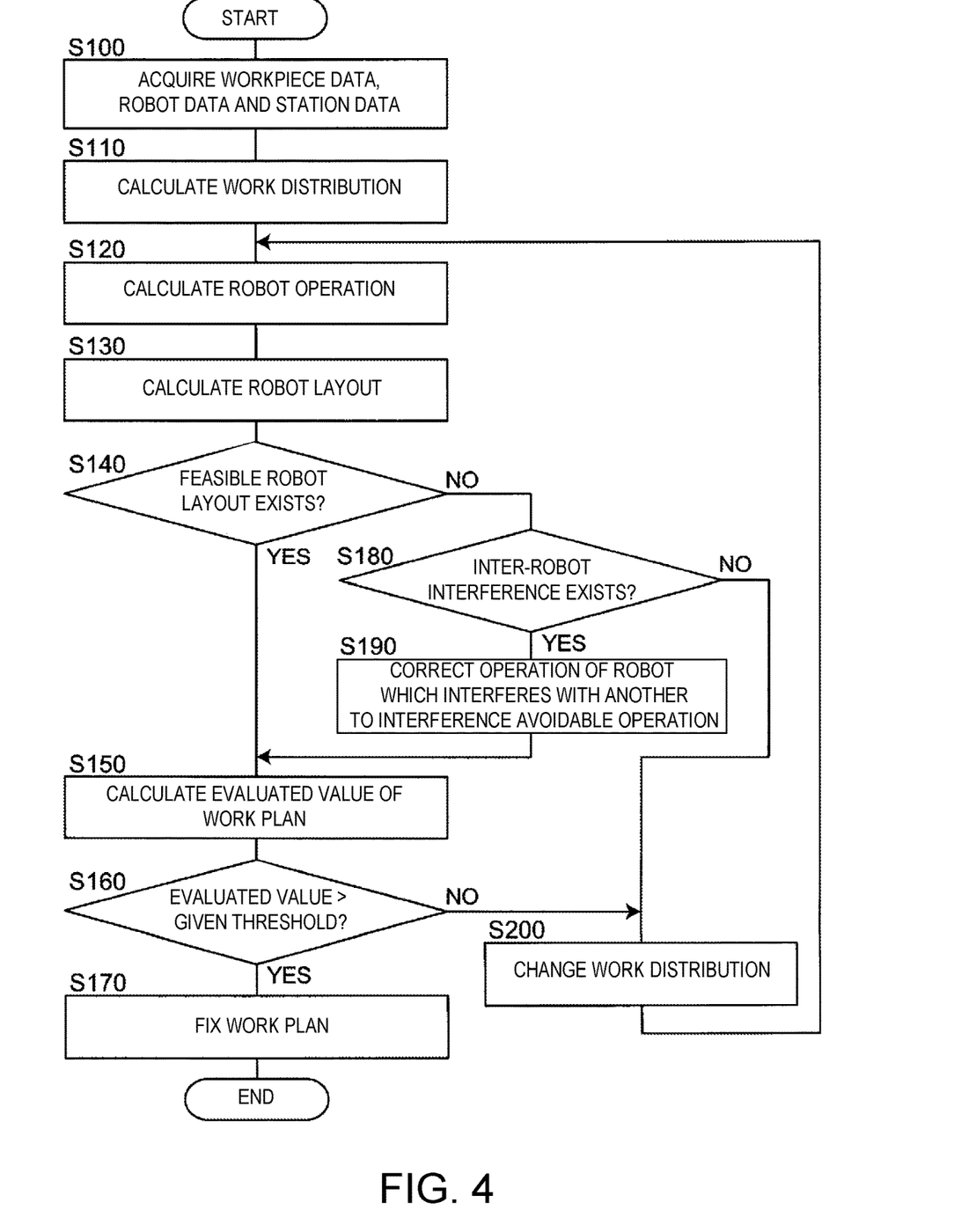
FIG. 4 is a flowchart illustrating one example of a method of creating the work plan for robots.

FIG. 4 is a flowchart illustrating one example of the method of creating the work plan for the robots.

First, as the first Step S100, the work planning device 10 acquires, from the user, data (workpiece data) WD of the workpiece W, data (robot data) RD of the robots R1-R14, and data (station data) SD of the stations S1-S3. For example, it acquires these data through the input of the input device 40, through a recording medium, or through communication.

The workpiece data WD includes positional information on each of the plurality of work parts WP in the workpiece W (for example, coordinates), and content information on the work performed to each work part WP (for example, a plate thickness information required for the welding operation).

The robot data RD includes information on the total number of robots (upper limit number) and the work capability of each of the plurality of robots R1-R14. For example, it includes information on the workable range and the type of the work tool T which can be mounted (that is, a possible work).

The station data SD includes information on the total number of stations (upper limit number) and the size of each of the stations S1-S3 (that is, the size of a disposed area of the robot). The total number and each size of the stations are determined based on the size of the production line PL and the size of a factory where the production line PL is constructed.

At the next Step S110, the work distribution calculating module 22 of the arithmetic unit 20 calculates (determines) the distribution (work distribution) of the work part WP in the workpiece W for each of the plurality of robots R1-R14.

In detail, the work distribution calculating module 22 distributes the plurality of work parts WP of the workpiece W to each of the robots R1-R14 based on the position and the work content of the work part WP (information in the workpiece data WD), and the work capability of each of the robots R1-R14 (information in the robot data RD). That is, it distributes the available work parts to the robots, respectively.

For example, based on the positional information and the work content information of the work part WP in the workpiece data WD, the work part WP which can be included in a workable range of the robot R1 and where the work tool T of the robot R1 is operable, is distributed to the robot R1. Preferably, in order to shorten a moving path of the work tool T of the robot R1, a group of work parts WP, of which positions are close to each other, are distributed to the robot R1. Moreover, in order to make no large difference in the number of work parts distributed among the robots R1-R14, the work distribution is performed, for example, so that the number of work parts becomes as equal as possible.

In this embodiment, since the work tools T mounted on the robots R1-R14 are the clamp-type welding guns, the work parts WP are distributed in consideration of the plate thickness and the clamp direction.

Note that, upon the creation of the work plan for the robots, if it is permitted that the robot uses a plurality of types of work tools while changing the tools, the distribution of the work parts to each robot may be calculated on the assumption of the robot using a plurality of types of work tools while changing the tools. The work capability of the robot improves by using the plurality of types of work tools while changing the tools. Therefore, when distributing the work parts to the robot, the choice of the robot increases.

Moreover, when the plurality of work parts are distributed to the robot, a plurality of robot disposed locations with respect to the workpiece, where the robot can perform works to the work parts, may exist. A selection of one disposed location from the plurality of robot disposed locations is performed at a later process.

When the distribution of the plurality of work parts WP to the robots R1-R14 is finished (work distribution is finished), at the subsequent Step S120, the robot operation calculating module 24 of the arithmetic unit 20 calculates the robot operations (i.e., each operation of the robots R1-R14).

Figure 5A:
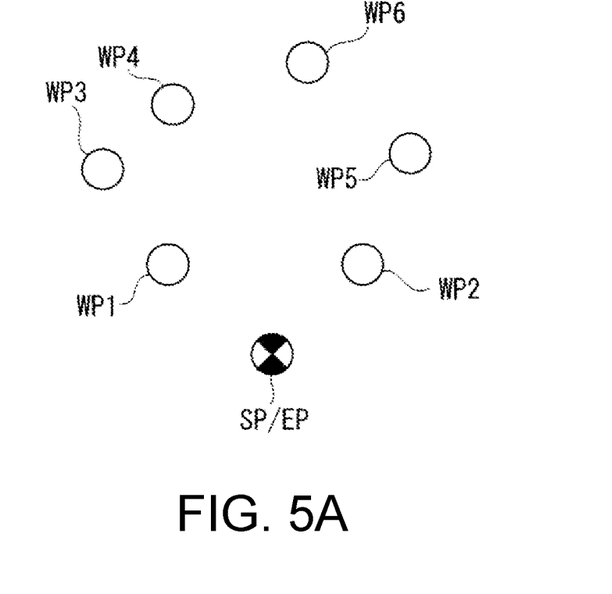
FIG. 5A is a view illustrating the plurality of work parts distributed to a certain robot.

FIG. 5A illustrates a plurality of work parts distributed to a certain robot. Moreover, FIG. 5B illustrates a work order of the plurality of work parts illustrated in FIG. 5A and a moving path of the work tool.

For example, as illustrated in FIG. 5A, the plurality of work parts WP1-WP6 are distributed to the robot R1 by the work distribution calculating module 22. In this case, the robot operation calculating module 24 calculates the operation of the robot R1 based on a given condition. For example, the operation of the robot R1 is calculated so that a work period required for finishing all the works at the plurality of work parts WP1-WP6 in one workpiece W is minimized. In detail, as the operation of the robot R1, the work order of the plurality of work parts WP1-WP6 and a moving path MP of the work tool T are calculated. Note that the term "work period" as used herein includes a transition period from a standby position SP/EP of the work tool T to the work part which is processed first, a transition period between the work parts, and a transition period from the work part which is processed at the last to the standby position SP/EP. The standby position SP at the start of work and the standby position EP after the end of work may be different positions. Moreover, the work period may be a time from the first work part to the standby position after the end of work.

Figure 5B:
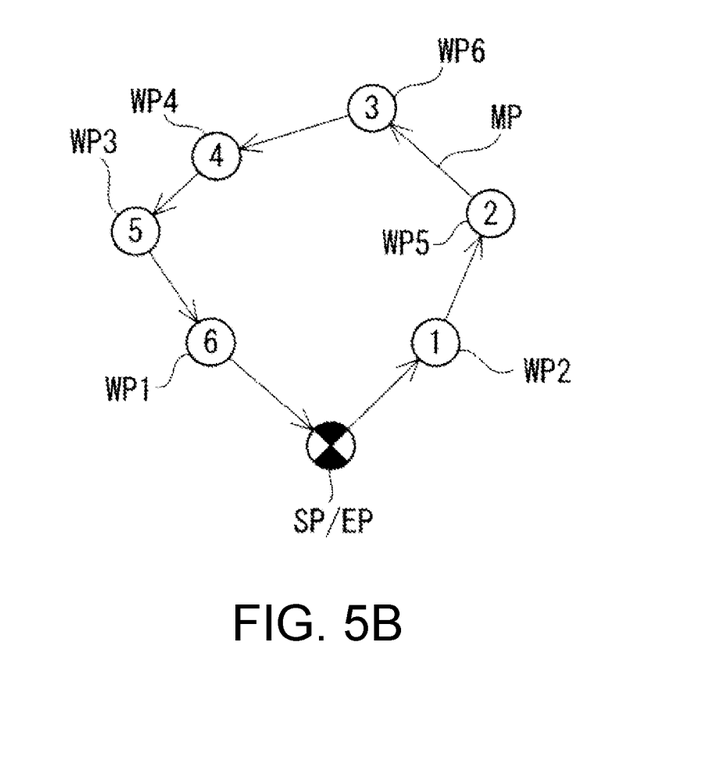
FIG. 5B is a view illustrating a work order of the plurality of work parts illustrated in FIG. 5A, and a moving path of a work tool.

For example, as illustrated in FIG. 5B, the robot operation calculating module 24 calculates WP2→WP5→WP6→WP4→WP3→WP1 as the work order of the work parts, and calculates the moving path MP in which the work tool T moves along the plurality of work parts WP1-WP6 in that order.

Note that, in FIG. 5B, although a part of moving path MP between the work parts is a straight line, it may be a curve depending on the robot's structure and/or in order to avoid an interference with the workpiece W.

Moreover, such a calculation of the operation of each robot is performed individually, without taking operation of other robots into consideration (i.e., without taking an interference with other robots into consideration). Therefore, a time required for calculating all the operations of the robots becomes shorter. The inter-robot interference is taken into consideration at a later process.

Moreover, if the robot has the plurality of robot disposed locations with respect to the workpiece where the robot can perform works to the distributed work parts, operation at each robot disposed location is calculated.

When the calculation of the operation of each of the robots R1-R14 is finished (the calculation of the robot operation is finished), the robot layout calculating module 26 of the arithmetic unit 20 calculates the robot layout at the subsequent Step S130.

In detail, the robot layout calculating module 26 calculates (determines) as the robot layout for each of the robots R1-R14, the disposed location with respect to the workpiece W and the stations S1-S3 where the robot is to be disposed so that an inter-robot interference does not occur during the execution of the robot operation calculated at Step S110.

Figure 6:
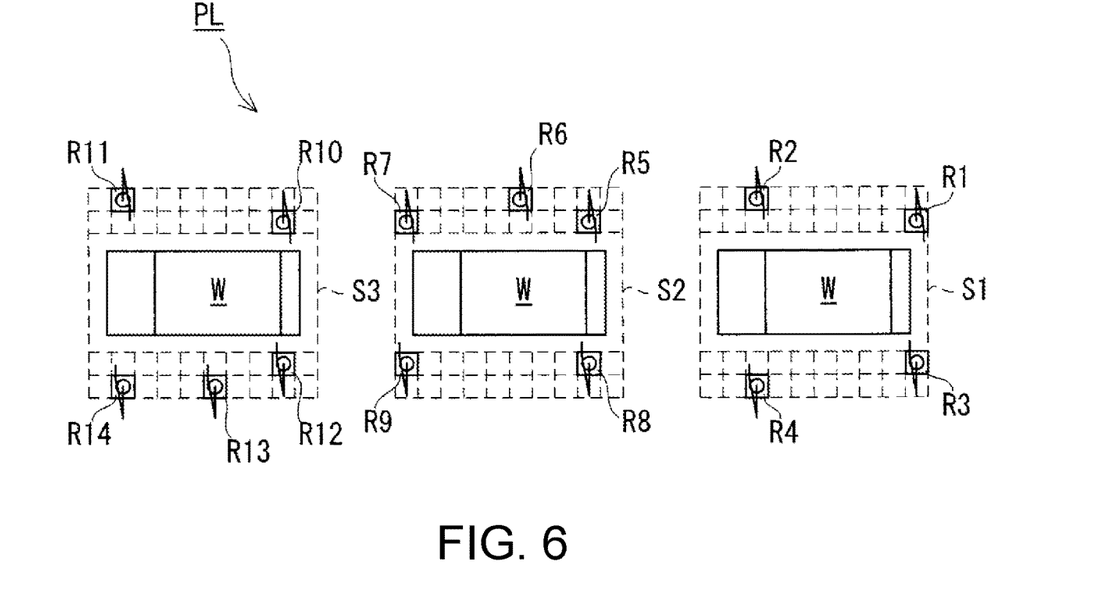
FIG. 6 is a view illustrating a robot layout.

FIG. 6 is a view illustrating the robot layout.

As illustrated in FIG. 6, for each of the plurality of robots R1-R14, the disposed location with respect to the workpiece W is calculated (determined), and the station to be disposed is also calculated (determined).

First, for each of the plurality of robots R1-R14, the disposed location with respect to the workpiece W is determined so that the robots do not contact each other (the inter-robot interference does not occur), when each of the robots R1-R14 carries out the operation calculated by the robot operation calculating module 24 at Step S120.

For example, if the robot has the plurality of robot disposed locations with respect to the workpiece where the robot can perform works to the distributed work parts, the disposed location where the inter-robot interference does not occur is determined out of the plurality of robot disposed locations.

Moreover, for example, like the robot R7 allocated at the station 2 and the robot R11 allocated at the station S3 as illustrated in FIG. 6, the plurality of robots which may cause the inter-robot interference because the disposed locations with respect to the workpiece are close to each other, are allocated at the different stations.

Further, for example, a plurality of robots of which disposed locations with respect to the workpiece W at least partially overlap with each other may exist. For example, as illustrated in FIG. 6, the robot R5 and the robot R10 have the same disposed location with respect to the workpiece W. Moreover, the robot R8 and the robot R12 have the same disposed location with respect to the workpiece W. In this case, since these robots cannot be disposed at the same station, the robot R10 is allocated at the station S3 which is different from the station S2 where the robot R5 is allocated, as illustrated in FIG. 6. Similarly, the robot R12 is allocated at the station S3 which is different from the station S2 where the robot R8 is allocated.

That is, when the inter-robot interference may occur, or when the robots of which disposed locations with respect to the workpiece at least overlap with each other exist, the number of stations is increased in order to solve the problem.

A plurality of robot layouts may be calculated as such a calculation result of the robot layout by the robot layout calculating module 26. Alternatively, any feasible robot layout may not exist.

Therefore, at Step S140, the arithmetic unit 20 first determines whether a feasible robot layout exists as the calculation result of the robot layout calculating module 26. If the feasible robot layout exists, it transits to Step S150. If no feasible robot layout exists, it transits to Step S180.

At Step S150, the work plan evaluating module 28 of the arithmetic unit 20 evaluates the work plan, and saves the evaluation result in the memory 34 as data. That is, the work plan evaluating module 28 evaluates the work distribution calculated by the work distribution calculating module 22 at Step S110, the robot operation calculated by the robot operation calculating module 24 at Step S120, and the work plan including the robot layout calculated by the robot layout calculating module 26 at Step S130. In detail, the work plan evaluating module 28 calculates and saves an evaluated value of the work plan.

For example, the evaluated value of the work plan is calculated based on a cycle time of the workpiece W when executing the work plan (a time required for finishing the works to all of the plurality of work parts of the workpiece W). The work plan evaluating module 28 calculates a higher evaluated value as the cycle time becomes shorter.

Additionally or alternatively, the work plan evaluating module 28 may evaluate the work plan based on the number of stations. In this case, the work plan evaluating module 28 calculates a higher evaluated value as the number of stations is less. Note that, when evaluating both the cycle time and the number of stations as criteria for the evaluation, the evaluated value may be calculated by using either one of the cycle time and the number of stations as weight values. Moreover, if the plurality of work plans exist (that is, if the plurality of robot layouts are calculated as the calculation result of the robot layout calculating module 26), the work plan evaluating module 28 calculates the evaluated value for each work plan.

For example, the user may set a criterion for the evaluation (cycle time) to be adopted for the work plan evaluating module 28 evaluating the work plan. In this case, the work plan evaluating module 28 evaluates higher as the work plan is closer to a work plan which is desired by the user.

At Step S160, the arithmetic unit 20 determines whether the evaluated value of the work plan calculated by the work plan evaluating module 28 is above a given threshold. The given threshold is a threshold of whether the user is satisfied with the work plan. This given threshold may be set by the user. If the evaluated value is above the given threshold, it transits to Step S170. Otherwise, it transits to Step S200. In some cases, it may not be determined that the evaluated value of the work plan is above the given threshold no matter how many times the determination processing at Step S160 is repeated. In consideration of this situation, when the number of determination processings at Step S160 exceeds a given number of repeats, it may notify the user of this situation, and may end the creation of the work plan.

At Step S170, the arithmetic unit 20 determines the work plan of which the evaluated value is above the threshold, and outputs the determined work plan to the user through the output device 50. Note that, if the evaluation results (evaluated values) for a plurality of work plans are saved in the memory 34, and among these, a plurality of work plans of which the evaluated value is above the threshold exist, a work plan with the highest evaluated value is determined and outputted to the user.

On the other hand, if it is determined that no feasible robot layout exists at Step S140, the arithmetic unit 20 determines at Step S180 whether the cause of no feasible robot layout is an occurrence of the inter-robot interference. If the occurrence of the inter-robot interference is the cause of no feasible robot layout, it transits to Step S190. Otherwise, it transits to Step S200.

At Step S190, the robot operation correcting module 30 of the arithmetic unit 20 corrects operation of one of the robots which interfere with each other to operation which can avoid the occurrence of interference (interference avoidable operation).

Figure 7:
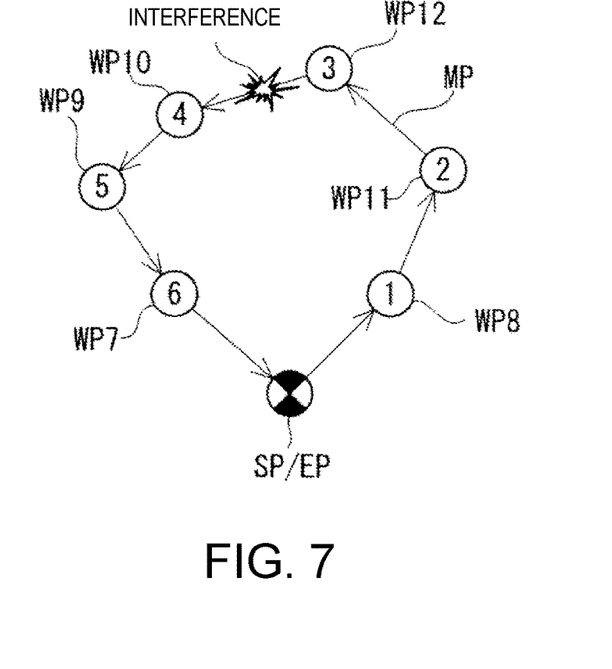
FIG. 7 is a view illustrating an inter-robot interference.

FIG. 7 illustrates one example of the inter-robot interference.

Here, one example where an interference occurs during operation between the robot R5 and the robot R6 is described. FIG. 7 illustrates the work parts WP7-WP12 for the robot R5, and the moving path MP of the work tool T. Here, an inter-robot interference in which the work tool T of the robot R5 which is moving toward the work part WP10 from the work part WP12 contacts the other robot R6 occurs.

In order to avoid such an occurrence of the inter-robot interference between the work part WP12 and the work part WP10, the robot operation correcting module 30 corrects the operation of the robot R5.

Figure 8A:
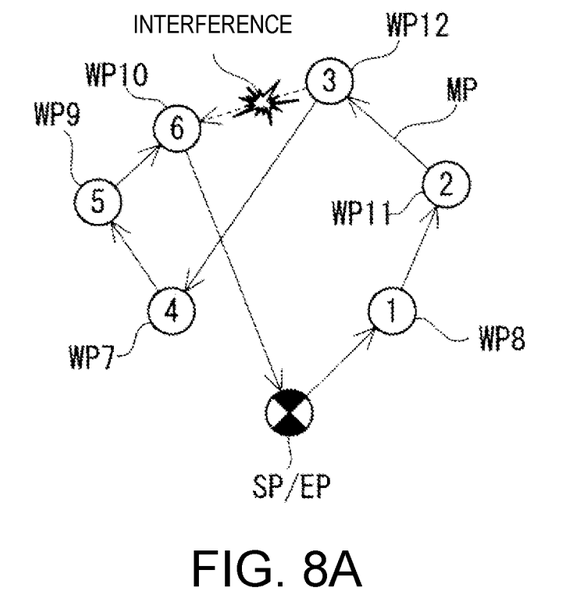
FIG. 8A is a view illustrating one example of a correction of a robot operation.

FIG. 8A illustrates one example of the correction of the robot operation. Moreover, FIG. 8B illustrates another example of the correction of the robot operation.

As illustrated in FIG. 8A, the robot operation correcting module 30 changes the work order of the plurality of work parts WP7-WP12 for the robot R5, in order to avoid the occurrence of the inter-robot interference between the work part WP12 and the work part WP10. Therefore, the moving path MP of the work tool T of the robot R5 is changed, and as the result, the occurrence of the inter-robot interference which occurs between the work part WP12 and the work part WP10 can be avoided.

Figure 8B:
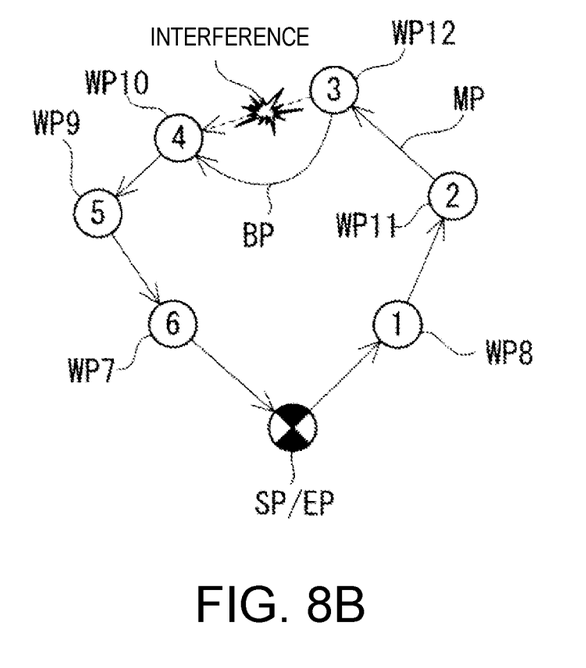
FIG. 8B is a view illustrating another example of the correction of the robot operation.

Alternatively, as illustrated in FIG. 8B, in order to avoid the occurrence of the inter-robot interference between the work part WP12 and the work part WP10, the robot operation correcting module 30 changes a part of the moving path MP between the work part WP12 and the work part WP10 for the robot R5 into a detour pass BP which can bypass the position where the inter-robot interference occurs. Therefore, the occurrence of the inter-robot interference which occurs between the work part WP12 and the work part WP10 can be avoided.

Alternatively, the robot operation correcting module 30 suspends the operation of one of the robot R5 and the robot R6, while the other robot operates, in order to avoid the occurrence of the inter-robot interference between the work part WP12 and the work part WP10. In detail, the other robot temporarily stops at a position different from the interference position until one robot passes through the interference position. Therefore, the occurrence of the inter-robot interference which occurs between the work part WP12 and the work part WP10 can be avoided.

Note that the robot operation correcting module 30 may reverse the work order of the plurality of work parts, as long as the occurrence of the inter-robot interference which occurs between the work part WP12 and the work part WP10 can be avoided. In this case, the work period before correcting the operation or motion and the work period after correcting the operation are hardly different.

Moreover, among the robots which interfere with each other, the robot of which the operation is corrected in order to avoid the occurrence of interference may be one or both of the robots. If correcting the operation of one of the robots, the robot of which the operation is corrected is desirably a robot with shorter work period. This is because the robot's work period may be extended by the correction of the operation. If the operation of the robot with the longer work period is corrected, the cycle time of the workpiece may be extended when the robot is a robot which requires the longest work period.

After such a correction of the operation of the interfering robots by the robot operation correcting module 30 is finished, it transits to Step S150, where the evaluated value of the work plan including the robot layout by which the occurrence of the inter-robot interference is avoided is calculated.

On the other hand, if it is determined at Step S180 that the cause by which no feasible robot layout exists is not the occurrence of the inter-robot interference, or if it is determined at Step S160 that the work plan with the evaluated value above the given threshold does not exist, the work distribution changing module 32 of the arithmetic unit 20 changes the plurality of work parts WP which are distributed to the plurality of robots R1-R14 (changes the work distribution) at Step S200.

Note that, as a supplement, one example of a case is described, where the cause of no feasible robot layout is not the occurrence of the inter-robot interference. For example, if there are four robots of which the disposed locations with respect to the workpiece W at least partially overlap, and the upper limit of the number of stations is three, there is no robot layout which satisfies these conditions.

In detail, at Step S200, since there is no feasible robot layout in the work distribution calculated by the work distribution calculating module 22 at Step S110, or there is no work plan with the evaluated value above the given value, the work distribution changing module 32 changes the work distribution calculated at Step S110.

The work distribution changing module 32 changes the work distribution by re-distributing at least one work part of at least one robot in the work distribution calculated so far to another robot which can work the work part.

Note that the work distribution changing module 32 desirably distributes at least one work part which is distributed to the robot with the longest work period among the plurality of robots R1-R14 to another robot. On the other hand, the robot to which the work part is distributed is desirably a robot with a relatively short work period, if possible. Alternatively, at least one work part distributed to the robot with the longest work period may be exchanged with at least one work part distributed to another robot. Therefore, the cycle time of the workpiece W can be shortened.

When the change in the work distribution by the work distribution changing module 32 at Step S200 is finished, it returns to Step S120, where the robot operation calculating module 24 calculates operation of each of the plurality of robots R1-R14 based on the changed work distribution.

By such a method of planning the work for the robots illustrated in FIG. 4, the work plan of the plurality of robots for performing the works to the plurality of work parts of the workpiece is created.

According to the above embodiment, the work plan for the robots can be created in a short period of time, which includes, in addition to the work distribution to the plurality of robots and the operation of each robot, the selection of the disposed location of each robot with respect to the workpiece and the station where each robot is allocated, and satisfies the demands, such as the space-saving (fewer stations) and the shorter cycle time.

In detail, the work plan is created while taking into consideration the work distribution to the plurality of robots and the operation of each robot, as well as the disposed location of each robot with respect to the workpiece and the station where each robot is allocated. As a result, a more optimal work plan can be created for the production line including at least one station.

Moreover, the distribution (work distribution) of the plurality of work parts of the workpiece to the plurality of robots is calculated based on the work capability of each robot, without taking the disposed location of each robot with respect to the workpiece into consideration. As a result, the work distribution can be calculated in a short period of time.

Moreover, the calculation of the operation of each robot is performed individually based on the work distribution calculated (determined) previously (using the work distribution as a fixed condition), without taking the interference with other robots into consideration. As a result, the operation of each robot can be calculated in a short period of time.

Then, the disposed location of each robot with respect to the workpiece and the station where each robot is disposed are calculated so that the inter-robot interference does not occur, based on the operation of each robot calculated (determined) previously (using the robot operation as a fixed condition).

As these results, the work plan for the plurality of robots can be created in a short period of time.

Note that the work plan which can satisfy the user may not be eventually calculated. In that case, the user changes the number of robots which is the precondition required for the calculation of the work plan (updates the total number information of the robots in the robot data RD), and the work planning device 10 calculates the work plan based on the changed number of robots. Therefore, the work plan which satisfies the user can be calculated. That is, it becomes possible for the user to consider the work plan while also taking the number of robots into consideration.

As described above, although the present disclosure is described based on the above embodiment, the embodiment of the present disclosure is not limited to the above embodiment.

For example, in the above embodiment, as illustrated in FIG. 1, although the workpiece is the body of the automobile and the plurality of work parts of the workpiece are the welding locations (the robot is the welding robot and the work tool is the welding gun), the embodiment of the present disclosure is not limited to this configuration. For example, the work which is performed by the robot to the workpiece may be painting, assembling, cutting, etc.

INDUSTRIAL APPLICABILITY

The present disclosure is applicable to planning of the work plan for the plurality of robots, each having the work tool, sharing the work to the plurality of work parts of the workpiece.

The invention claimed is:

1. A method of planning work for robots and placing the robots, the method comprising:
    creating a work plan for each of the robots, each of the robots having a work tool, to perform work to a plurality of work parts of a workpiece at a plurality of work stations, wherein the work stations are different positions for the workpiece;
    calculating a distribution of the work parts to the robots based on the positions of the work parts, content of the work, and work capabilities of the robots;
    calculating, as a robot operation, a work order of the work parts and a moving path of the work tool for each of the robots based on the calculated work distribution;
    calculating a disposed location of each of the robots with respect to the workpiece and a station of the plurality of stations where the robot is disposed so that an inter-robot interference does not occur during execution of the calculated robot operation, and when at least two of the robots of which the disposed locations with respect to the workpiece at least partially overlap with each other at the station, the calculating the disposed location includes disposing each of the at least two of the robots to a different one of the plurality of stations; and
    moving each of the robots to the disposed location and the station that are calculated for each of the robots.

2. The method of claim 1, comprising calculating a cycle time of the workpiece when executing the work plan, and calculating an evaluated value of the work plan based on the cycle time.

3. The method of claim 2, wherein the evaluating the work plan includes calculating the evaluated value of the work plan based on the cycle time and a number of the stations.

4. The method of claim 2, comprising re-distributing at least one work part of one of the robots to another one of the robots capable of working the at least one work part, when the calculated evaluated value is below a given threshold,
    wherein the calculating the robot operation includes calculating the operation of each of the robots based on the changed work distribution.

5. The method of claim 4, wherein the one of the robots from which the work part is re-distributed has the longest work period among the robots, the work period being required for finishing the work to all the distributed work parts.

6. The method of claim 1, comprising, when no feasible robot layout exists by an occurrence of the inter-robot interference, correcting the operation of one of the robots interfering with each other to an interference avoidable operation to avoid the interference by suspending the one robot while the other robot operates, changing the work order of the work parts, or changing the moving path of the work tool.

7. The method of claim 6, wherein the robot of which the work order of the work parts or the moving path of the work tool is changed is a robot with a shorter work period among the robots interfering with each other.

8. The method of claim 1, wherein the robots are welding robots, and the work tool is a welding gun.

9. The method of claim 1, comprising, when no feasible robot layout exists due to an occurrence of the inter-robot interference by two of the robots that are each at different locations, correcting the operation of one of the two robots to an interference avoidable operation to avoid the interference by suspending the one of the two robots while the other of the two robots operates, changing the work order of the work parts, or changing the moving path of the work tool.

10. A robot system comprising:
   robots, each of the robots having a work tool to perform work to a plurality of work parts of a workpiece;
   a plurality of stations that are different positions for the workpiece;
   a work planning device for the robots, the work planning device being configured to create a work plan for each of the robots, the work planning device comprising a processor configured to:
   calculate a distribution of the work parts to the robots based on the positions of the work parts, content of the work, and work capabilities of the robots;
   calculate, as a robot operation, a work order of the work parts and a moving path of the work tool for each of the robots based on the work distribution calculated; and
   calculate a disposed location of each of the robots with respect to the workpiece and a station of the plurality of stations where the robot is disposed so that an inter-robot interference does not occur during execution of the robot operation calculated, and when at least two of the robots of which the disposed locations with respect to the workpiece at least partially overlap with each other at the station, calculate the disposed location of the at least two of the robots to be a different one of the plurality of stations, wherein
   in response to the disposed location and the station being calculated for each of the robots, the robots are placed at the disposed location and the station that are calculated.

11. The robot system of claim 10, wherein the processor is configured to calculate a cycle time of the workpiece when executing the work plan, and calculate an evaluated value of the work plan based on the cycle time.

12. The robot system of claim 11, wherein the processor is configured to calculate the evaluated value of the work plan based on the cycle time and a number of the stations.

13. The robot system of claim 11, wherein the processor is configured to re-distribute at least one work part of one of the robots to another one of the robots capable of working the at least one work part, when the evaluated value calculated is below a given threshold,
   wherein the processor is configured to calculate the operation of each of the robots based on the changed work distribution.

14. The robot system of claim 13, wherein the one of the robots from which the work part is re-distributed has the longest work period among the robots.

15. The robot system of claim 10, wherein the processor is configured, when no feasible robot layout exists by an occurrence of the inter-robot interference, to correct the operation of one of the robots interfering with each other to an interference avoidable operation to avoid the interference by suspending the one robot while the other robot operates, changing the work order of the work parts, or changing the moving path of the work tool.

16. The robot system of claim 15, wherein the robot of which the work order of the work parts or the moving path of the work tool is changed is a robot with a shorter work period required for finishing the work to all the distributed work parts among the robots interfering with each other.

17. The robot system of claim 10, wherein the robots are welding robots, and the work tool is a welding gun.

18. The robot system of claim 10, wherein the processor is configured, when no feasible robot layout exists by an occurrence of the inter-robot interference by two of the robots that are each at different locations, to correct the operation of one of the two robots to an interference avoidable operation to avoid the interference by suspending the one of the two robots while the other of the two robots operates, changing the work order of the work parts, or changing the moving path of the work tool.

* * * * *